No. 856,555. PATENTED JUNE 11, 1907.
C. A. THOMSON.
DOUGH MOLDING MACHINE.
APPLICATION FILED JULY 25, 1906.

4 SHEETS—SHEET 1.

WITNESSES
Frederick Germain Jr.
Ethel B. Reed

INVENTOR
Charles A. Thomson.
BY
Russell M. Everett,
ATTORNEY.

No. 856,555.

PATENTED JUNE 11, 1907.

C. A. THOMSON.
DOUGH MOLDING MACHINE.
APPLICATION FILED JULY 25, 1906.

4 SHEETS—SHEET 2.

WITNESSES

INVENTOR
CHARLES A. THOMSON.

BY
ATTORNEY.

No. 856,555. PATENTED JUNE 11, 1907.
C. A. THOMSON.
DOUGH MOLDING MACHINE.
APPLICATION FILED JULY 25, 1906.
4 SHEETS—SHEET 4.
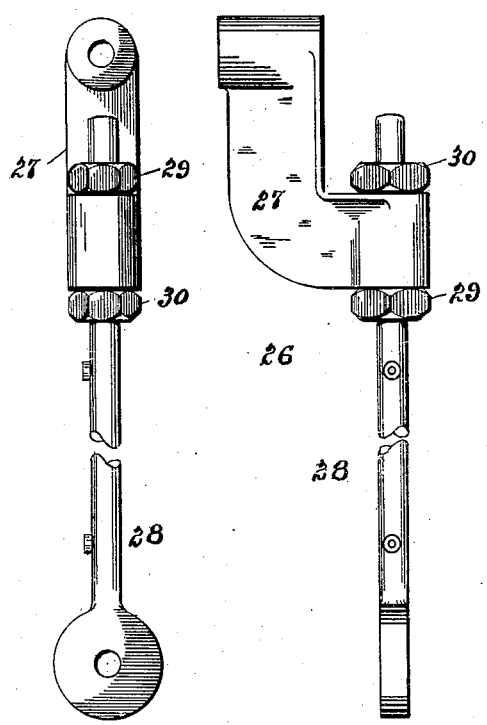
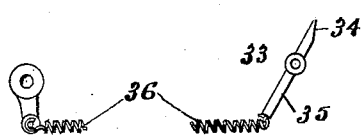
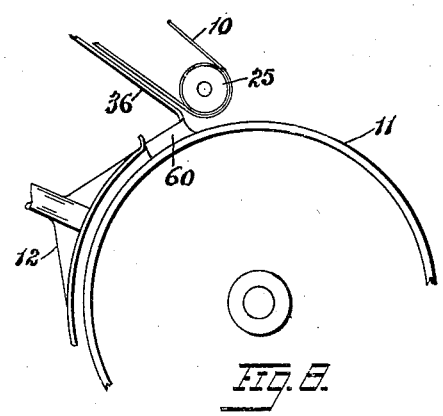
WITNESSES
INVENTOR
CHARLES A. THOMSON.
BY
ATTORNEY.

UNITED STATES PATENT OFFICE.

CHARLES A. THOMSON, OF BELLEVILLE, NEW JERSEY.

DOUGH-MOLDING MACHINE.

No. 856,555.      Specification of Letters Patent.      Patented June 11, 1907.

Application filed July 25, 1906. Serial No. 327,641.

*To all whom it may concern:*

Be it known that I, CHARLES A. THOMSON, a subject of the King of Great Britain, residing at Belleville, in the county of Essex and State of New Jersey, have invented certain new and useful Improvements in Dough-Molding Machines, of which the following is a specification.

The objects of the invention are to provide a dough-molding machine having a single drum which shall be adapted to produce loaves of different lengths and sizes; to thus simplify and facilitate the molding operations; to provide for this purpose an adjustable compression plate which forms with the drum a space which is not limited laterally; to enable the said compression plate to be suitably adjusted to vary the said space and produce the desired lengths of loaves; to provide two independent and separately adjustable plates working in conjunction with the drum; to enable the machine to be accommodated to different consistencies of dough, such as stiff or slack dough, and secure uniform results in the loaves; to provide an automatically adjustable curling belt which passes around and is driven by one of the gaging rollers; to provide improved means for diverting the dough from the gaging rollers, and to secure other advantages and results as may be brought out in the following description.

Figure 1:
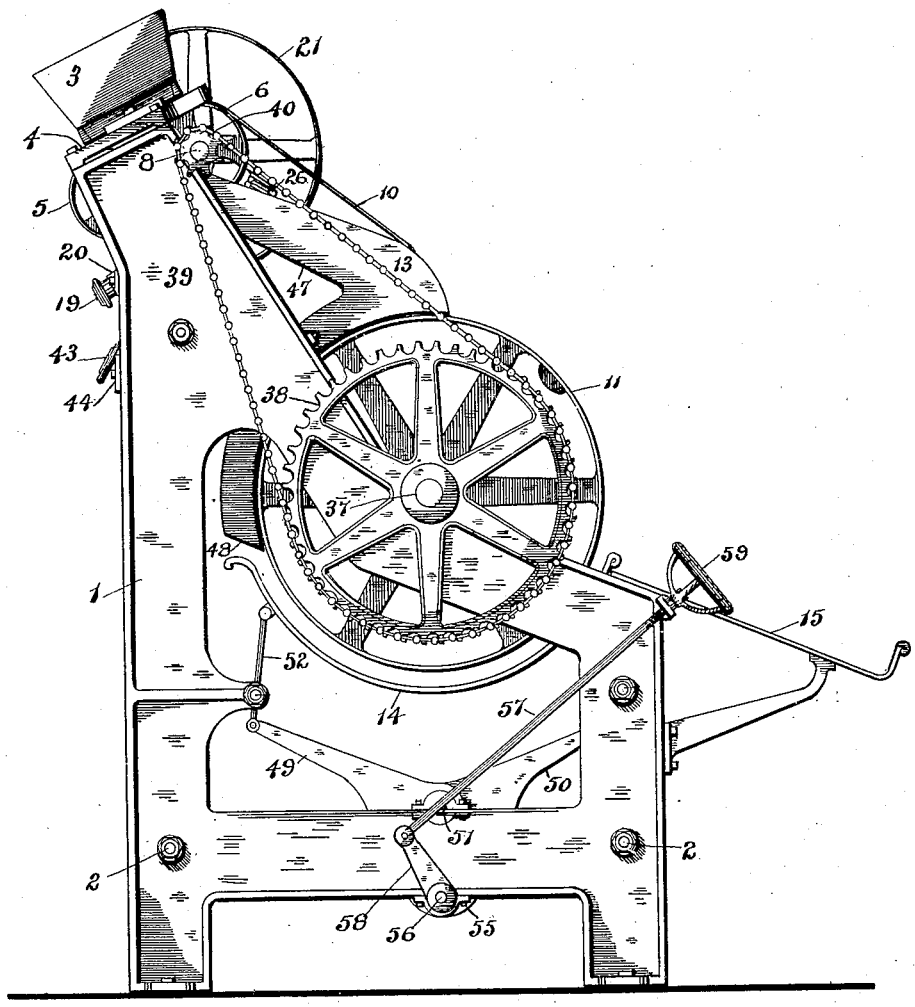
Figure 2:
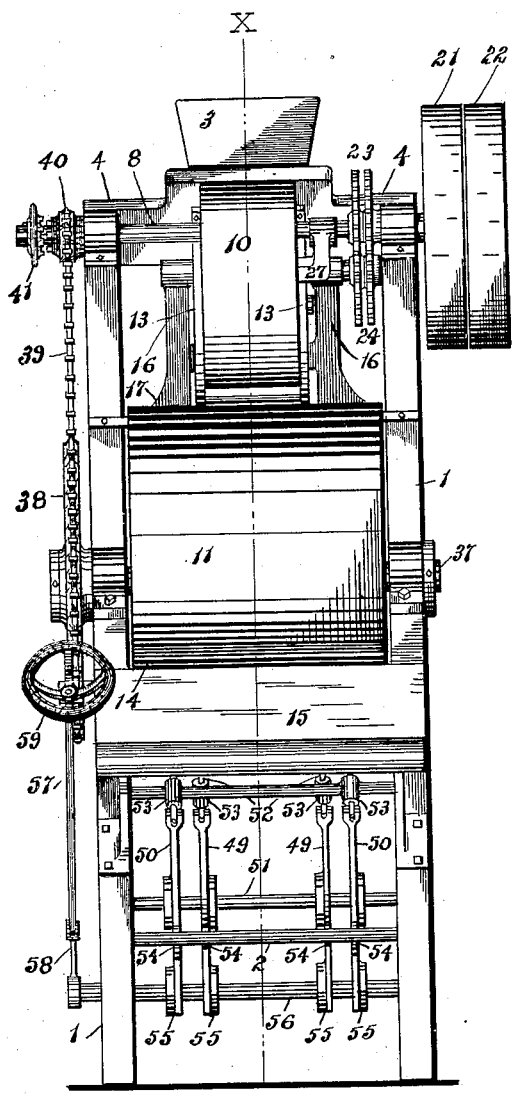
Figure 3:
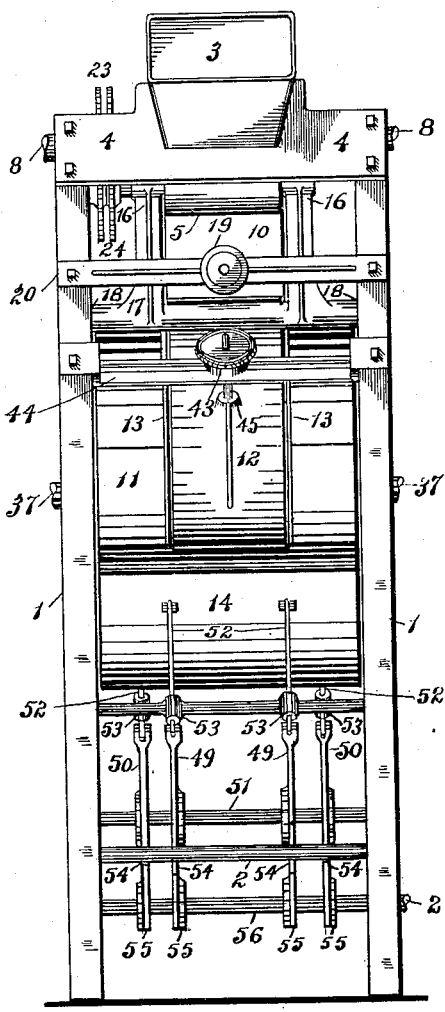
Figure 4:
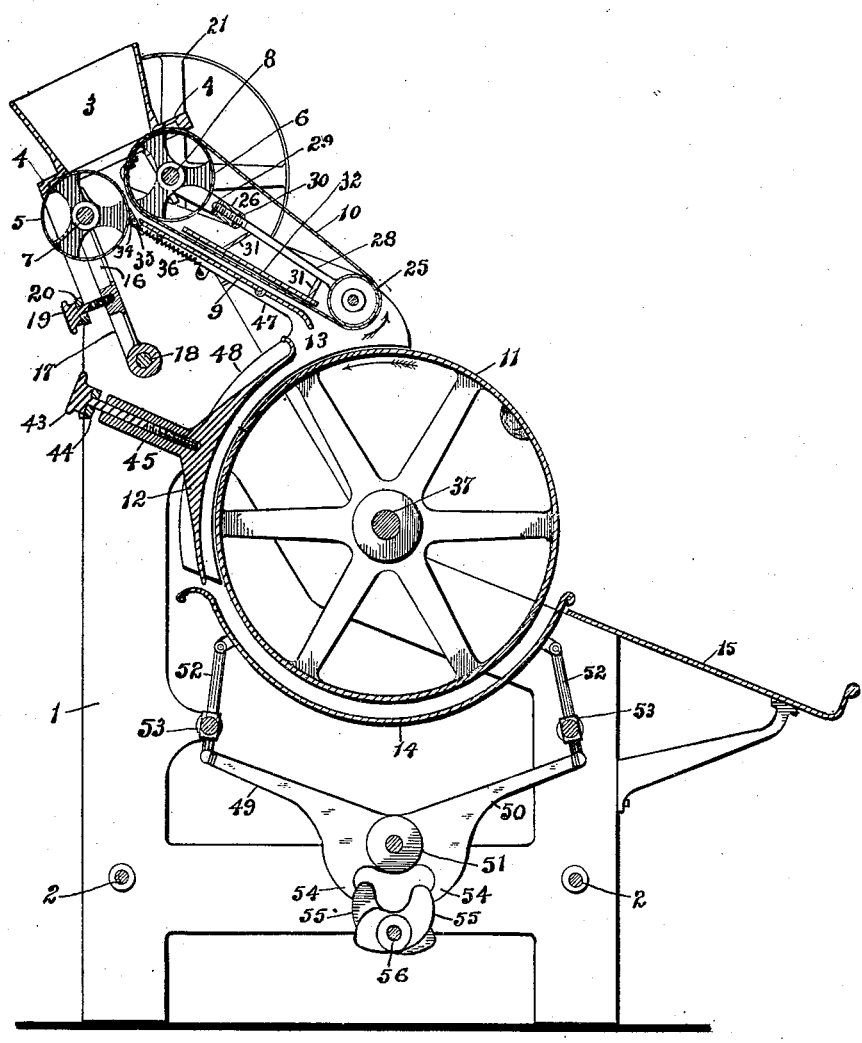

Referring to the accompanying drawings, in which like numerals of reference indicate corresponding parts in each of the several figures, Figure 1 is a side elevation of my improved machine; Fig. 2 is a front elevation of the same, and Fig. 3 a rear elevation; Fig. 4 is a central vertical section taken on line *x*, Fig. 2; Fig. 5 is an edge view of a certain adjustable curling-belt roller bracket, and Fig. 6 is a plan of the same; Fig. 7 is a detail view of a certain scraper for the gaging roller; Fig. 8 is a detail view of a certain guide block for use with slack doughs.

In said drawings, 1, 1 indicate the side-plates of a frame of any suitable construction adapted to support the working parts of my machine, said side-plates being connected as by tie-rods 2, or other suitable means. At the extreme upper part of the said frame of the machine is a hopper 3, adapted to receive the pieces of dough to form the loaves. This hopper 3, is bolted by means of lateral extensions 4, 4, of itself to the said machine frame, and beneath the hopper are arranged gaging rollers 5, 6, upon transverse shafts 7, 8, respectively, and between which rollers the dough passes and is flattened out into a sheet. Beyond the said gaging rollers is a lower inclined curling-plate 9, above which parallel thereto runs a curling belt 10, the effect of which in coöperation with the stationary plate 9, is to roll the sheet of dough into a convolute form. The dough thus rolled then falls upon the drum 11, which normally rotates in the direction indicated by the arrow, so that the dough is carried downwardly between a shaping plate 12, having sides 13 and the drum 11; it then enters between a compression plate 14, and the drum 11, forming a space which has no lateral limits, and is passed through this out onto a shelf or delivery board 15.

Now taking up the several parts more in detail, the lower gaging roller 5 is preferably adjustable toward and away from the other by means of its shaft 7 being journaled in the arms 16, 16, of a bracket 17, hinged as at 18 to swing freely. A hand screw 19 working through the cross-bar 20 on the frame 1 engages the said bracket 17 to swing the same. The other gaging roller 6 has its shaft 8 journaled in or on the side-plates 1 of the machine frame and projecting therebeyond. One end of said projecting shaft 8 receives fast and loose driving pulleys 21, 22, and from the said shaft 8, the companion shaft 7 is driven by means of gears 23, 24. The curling-belt 10, preferably runs around the roller 6 and at its opposite lower end around a smaller roller 25 which is pivotally carried by an arm extending from the shaft 8 and adapted to swing thereon. The said arm 26 comprises an L-shaped portion 27 which is adapted to lie on the shaft 8 at one side of the roller 6 and have its other extremity projecting transversely between the folds or strands of the belt at a point outside the periphery of the roller. A rod 28 then extends from said arm to carry the roller 25 and is made adjustable in the said portion 27, and secured where desired by means of lock nuts 29, 30. Furthermore the said rod 28 carries by means of posts 31, a supporting plate 32 adapted to lie against the inside of the belt 10 adjacent to the inclined table 9 and parallel thereto. This reinforces the said belt as the roll of dough increases in diameter during its passage downward to the drum 11, and a pressure is secured upon the said roll of dough which is due to the weight of the pivotal arm 26 and parts carried thereby. The curling-plate 9 is simply a flat plate mounted between the sides of the machine frame and being considerably narrower in width, being inclined downwardly from the gaging rollers 5, 6 to the drum 11.

To prevent the dough from following around the lower gaging roller 5, instead of passing onto the curling plate 9, I have provided a scraper 33 sharpened at one edge as 34 to lie against the roller and being pivoted at its opposite ends to swing upon a horizontal axis. An arm 35, preferably extends backward from the line of pivoting and receives a coiled spring 36 which is attached to any suitably fixed part of the machine and resiliently holds the scraper against the roller, as shown more clearly in Fig. 8.

At the lower forward end of the inclined plate 9 and its related parts just described, is stationed a drum 11, preferably upon a shaft 37 extending transversely of the machine and journaled upon the side-plates 1. Outside one of said side-plates, the said shaft 37 carries a chain-gear 38, from which a chain 39 extends to a similar coöperating gear 40 upon the shaft 8,—preferably that end of the shaft which is opposite from the pulleys 21, 22. The drum is thus driven, and preferably a clutch 41 is provided upon the said shaft 8 so that the drum can be stopped from rotating when desired.

Adjacent to the drum 11 and beneath the inclined plate 9, is arranged the shaping plate 12, which presents toward the drum 11 a correspondingly curved surface 42, providing a space between said plate and drum through which the loaf passes and is thoroughly and firmly rolled into shape. Preferably the said shaping plate 12 is adjustable toward and away from the drum 11 by means of a hand screw 43, working through a cross-bar 44 of the machine, into a socket 45 of the shaping plate.

Lateral guides for the dough while passing through the curling and shaping devices, are provided by means of guards 13, which are arranged one at each side of the said passages to inclose and limit the same. These guides are thus of angular shape in side view of the machine, with their upper arms 47 serving for the curling means, while the lower arms 48 coöperate with the shaping plate 12 to form a closed passage for the dough.

Beneath the drum 11 is located the compression plate 14, which preferably comprises a stiffly flexible plate conforming in curvature to the surface of the drum, at a variable distance therefrom, and extending from the shaping plate 12 around to the delivery board 15. This plate is adapted to be moved toward or away from the drum 11 as desired, and it serves to elongate and reduce the diameter of a loaf which has come from the shaping plate 12, and whose shape it is desired to change. There being no lateral limits to the space between said drum and compression plates, it is obvious that the operation of the latter is unhampered. For adjusting the said compression plate 14, I preferably employ the means shown in Fig. 1–4 inclusive, where 49, 50 represent opposite arms fulcrumed or pivoted upon the cross-rod 51 and connected at their extremities to the compression plate 14 as by slide-bar 52, preferably working through pivotal slide-ways or boxes 53 on the frame of the machine. The levers 49, 50, preferably have downward extensions 54, which are adapted to be engaged by cams 55 upon a lower shaft 56, and by the turning of which the said cams, and levers, and thus the compression plate, is operated to vary its distance from the drum. Preferably this shaft 56 is turned by means of a screw-shaft 57 engaging at one end an arm 58 of the shaft 56, and having at the other end a hand-wheel 59.

It will be understood that by my improved construction of machine, the dough is first rolled into a sheet, curled, then shaped into a loaf with square ends by the plate 12, and then varied in size and length according to requirements, by the compression plate 14. A single machine, or one drum, thus suffices to form a great variety of loaves, or in other words, the capacity of the machine is greatly increased, and it is not necessary to have a plurality of machines. Expense and labor are thus saved and the manufacture of bread greatly facilitated, both for the small manufacturer as well as for large concerns. Furthermore by my improved machine, the operations can be varied to suitably form loaves of either slack or stiff dough, it being understood by those skilled in the art that a slack dough requires much less operating upon than a tight or stiff dough. Therefore if the dough is rather slack, the compression plate 14 may be adjusted so that its pressure upon the loaf is very slight, and if necessary the shaping plate 12 is also adjusted. In some cases the dough may be so slack that it will not be necessary to pass the loaf around the drum 11 at all, and in such cases I insert a block 60 at the top of the drum adjacent to the end of the curling table or plate as shown in Fig. 8, and then stop the rotation of said drum by means of the clutch 41, so that the loaf is discharged upon reaching the drum 11 and passes over the top of same onto the table 15. Again, the pressure exerted upon the dough as it passes over the curling plate is automatically regulated as the roll increases in size, by means of the pivotal arm 26, and the construction of the machine is simplified by utilizing the upper gaging roller as a driving pulley.

Various modifications and changes will suggest themselves to those skilled in the art and which could be made without departing from the spirit and scope of my invention, and I do not wish therefore to be understood as limiting myself by the positive descriptive terms herein employed, except as the state of the art may require.

Having thus described the invention, what I claim is:

1. In a dough molding machine, the combination with means for rolling a sheet of dough, curling the same, and kneading it into a loaf, of a rotatable drum and a compression plate forming with said drum a space open at or toward the ends of the drum, said space being adapted to receive the loaf from the shaping means.

2. In a dough molding machine, the combination with means for shaping a cylindrical loaf, of a drum, a compression plate forming with said drum a space which is not limited laterally, the said compression plate being adjustable toward and away from the drum and being located to receive the dough from said shaping means.

3. In a dough molding machine, the combination with means for rolling dough into a sheet and curling said sheet spirally, of a rotatable drum, shaping means forming with said drum a closed passage way for the dough, and a compression plate forming with said drum a passage way for the dough which is open at its sides, said compression plate being adapted to receive the dough from the shaping means.

4. In a dough molding machine, the combination with means for rolling dough into a sheet and means for curling said sheet spirally, of a rotatable drum, means forming with said drum a closed passage way adapted to receive the dough from the said curling means, and a compression plate forming with the drum a passage way for dough adjacent at one end to the said shaping means and being without lateral restrictions for the dough, said compression plate being adjustable toward and away from the drum.

5. In a dough molding machine, the combination with means for rolling dough into a sheet and curling the same spirally, of a rotatable drum, a pressure plate adjustable toward and away from the drum and adapted to receive the dough between itself and said drum, guards at the sides of said pressure plate adapted to shape the ends of the loaf, and a compression plate beyond said pressure plate and adjustable independently of the same to form with the drum a continued passage for the dough, said last mentioned passage being devoid of lateral walls or restrictions and the compression plate being adjustable toward and away from the drum.

6. In a dough molding machine, the combination with means for shaping a loaf, of a drum, a compression plate adjacent to the lower peripheral part of said drum, a shaft centrally disposed beneath said drum and compression plate, levers fulcrumed on said shaft and projecting oppositely therefrom, pivoted boxes on the frame of the machine, slide bars extending through said boxes and connecting the outer ends of said levers to the compression plate, and means simultaneously engaging the inner ends of said levers to swing the same.

7. In a dough molding machine, the combination with means for shaping a loaf, of a drum, a compression plate adjacent to the lower part of the periphery of said drum, a shaft centrally disposed beneath said drum and compression plate in fixed relation to the drum, levers fulcrumed on said shaft and projecting one on each side thereof and being pivotally connected at their outer ends to said compression plate, means adapted to simultaneously engage the inner ends of said levers or ends opposite those connected to the compression plate to swing said levers, and means for rotating said drum.

8. In a dough molding machine, the combination with means for shaping a loaf, said means including a rotatable drum, of a compression plate adjacent to the lower part of the periphery of said drum, a shaft centrally disposed beneath said drum and compression plate, levers mounted on said shaft and connected at their outer ends to said compression plate, a second shaft, cams upon said second shaft adapted to engage the inner ends of the said levers to swing the same, and means for turning said second shaft.

9. In a dough molding machine, the combination with side plates 1, 1, of a drum mounted between said side plates, a shaping plate adjustable toward and away from said drum at one side and being narrow in comparison with said drum, guards at the sides of said pressure plate whereby a closed passage is provided, a compression plate adjacent to the drum at a point beyond and adjacent to said pressure plate, said compression plate being of greater width than the pressure plate and forming with the drum a passage which allows lateral extension of the dough, and means for adjusting said compression plate.

10. In a dough molding machine, the combination with means for rolling a piece of dough flat and curling the same spirally, of a single drum, fixed guards forming for a circumferential portion of the drum a narrow passage way, a pressure plate adjustable between said guards toward and away from the drum, and a compression plate beyond and adjacent to said pressure plate, forming with the drum a passage wider than that between the said guards and having no lateral walls.

11. In a dough molding machine, the combination with a hopper, of gaging rollers to receive between themselves the dough from said hopper and roll the same into a sheet, an inclined plate to receive said sheet of dough and a yielding belt parallel to said plate and providing a moving surface which forms with the plate a passage-way between themselves for the dough.

12. In a dough molding machine, the combination with means for rolling the dough into a sheet, of a fixed inclined curling plate adapted to receive the sheet of dough, a belt contiguous to said plate and adapted to engage the dough thereon, a frame carrying said belt and being hinged at one end to swing with respect to said belt, and means for driving said belt in the direction of travel of the dough.

13. In a dough molding machine, the combination with a hopper and gaging rollers, of a curling-plate, a frame above said curling plate hinged at one end and adapted to swing downward at the other end by gravity, and a traveling belt carried on said frame and forming with the curling plate a passageway for the dough.

14. In a dough molding machine, the combination of rollers adapted to form the dough into a sheet, a curling plate, a belt traveling around one of said rollers and forming with the said plate a passageway to receive the dough from the rollers, and means for driving said parts.

15. In a dough molding machine, the combination with a curling plate, of a belt running over two pulleys and forming with said plate a passageway for dough, an arm pivoted concentrically with one of said pulleys and supporting the other, whereby said last mentioned pulley is automatically adjustable with respect to the curling plate under the pressure of the dough.

16. In a dough molding machine, the combination with a curling plate, of a belt running over two pulleys and forming with said plate a passage way for dough, an arm pivoted concentrically with one of said rollers and supporting the other, and a plate carried by said arm to lie against the opposite face of said belt from the curling plate.

17. In a dough molding machine, the combination with shafts and rollers thereon, of an arm upon one of said shafts comprising adjustable sections and carrying a third roller in alinement with the others, a belt around the two rollers thus supported upon the same shaft, and a curling plate extending from a point adjacent to the other roller and forming with the said belt a passage for dough.

18. In a dough molding machine, the combination with shafts, rollers mounted on said shafts to coöperate in rolling dough into a sheet, an arm upon one of said shafts in adjustable sections and bent to have its extremity in alinement with the roller on said shaft, a third roller carried at the end of said arm, a belt around said rollers thus mounted on the same shaft, and a pressure plate extending from the other roller to form with said belt a passage way for dough.

19. In a dough molding machine, the combination with a hopper, of a curling-plate, a frame above said curling plate hinged at its end next the said hopper, and a traveling belt carried on said frame and forming with the curling-plate a passageway for the dough.

20. In a dough molding machine, the combination with an adjustable pressure plate and an adjustable compression plate, of a single drum forming with said pressure plate and said compression plate independent passages for shaping a loaf, and means for supplying dough.

21. In a dough molding machine, the combination with a pair of rollers, of a belt running around one of said rollers, a curling plate extending from a point adjacent to the other roller to form with said belt a passage way for dough, and a scraper between said last mentioned roller and the curling plate, said scraper being pivoted upon an axis parallel to that of the roller and adapted at one side of said axis to bear against the roller, and a spring connecting said scraper on the opposite side of its axis to the curling plate.

22. In a dough molding machine, the combination with a curling plate and a traveling belt forming with said plate a passageway for dough, and a drum adjacent to the end of said passageway, of means located at the junction of said passageway and drum for guiding the dough over the circumference of said drum when the drum is stationary.

23. In a dough molding machine, the combination of a hopper, gaging rollers, means forming an inclined passage for the dough and adapted to roll or curl the same, and a drum located adjacent to the ends of said passage, of means for stopping the rotation of said drum independent of the other said parts, a guide located at the end of said passage adjacent to the drum and adapted to direct the dough in one direction around said drum or be removed to permit the dough to pass in the other direction, and means coöperating with said drum to form a loaf.

CHARLES A. THOMSON.

Witnesses:
FREDERICK GERMAN, Jr.,
ETHEL B. REED.